United States Patent
Lee et al.

(10) Patent No.: US 10,673,108 B2
(45) Date of Patent: Jun. 2, 2020

(54) LITHIUM-AIR BATTERY AND METHOD FOR MANUFACTURING THE SAME

(71) Applicant: IUCF-HYU (INDUSTRY-UNIVERSITY COOPERATION FOUNDATION HANYANG UNIVERSITY), Seoul (KR)

(72) Inventors: Yunjung Lee, Seoul (KR); Yangkook Sun, Seoul (KR); Jinbeom Park, Daegu (KR); Yosub Jeong, Seoul (KR)

(73) Assignee: IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 435 days.

(21) Appl. No.: 15/409,020

(22) Filed: Jan. 18, 2017

(65) Prior Publication Data

US 2017/0133733 A1    May 11, 2017

Related U.S. Application Data

(63) Continuation of application No. PCT/KR2015/007465, filed on Jul. 17, 2015.

(30) Foreign Application Priority Data

Jul. 18, 2014 (KR) .................. 10-2014-0090733

(51) Int. Cl.
*H01M 4/96* (2006.01)
*H01M 12/08* (2006.01)
(Continued)

(52) U.S. Cl.
CPC .......... *H01M 12/08* (2013.01); *H01M 4/382* (2013.01); *H01M 4/8673* (2013.01);
(Continued)

(58) Field of Classification Search
None
See application file for complete search history.

(56) References Cited

U.S. PATENT DOCUMENTS

2012/0141889 A1    6/2012   Lee et al.

FOREIGN PATENT DOCUMENTS

| EP | 2 477 264 A2 | 7/2012 |
| KR | 10-2012-0047602 | 5/2012 |

(Continued)

OTHER PUBLICATIONS

International Search Report for application No. PCT/KR2015/007465 dated Oct. 22, 2015.
(Continued)

*Primary Examiner* — Haixia Zhang
(74) *Attorney, Agent, or Firm* — Sughrue Mion, PLLC

(57) ABSTRACT

A lithium-air battery is provided. The lithium-air battery includes a negative electrode including lithium, a positive electrode including catalyst particles for controlling whether to generate LiO2 as a discharge product and for controlling a generation amount of LiO2, the positive electrode using oxygen as a positive electrode active material, and an electrolyte and a separator which are disposed between the negative electrode and the positive electrode.

3 Claims, 10 Drawing Sheets

(51) Int. Cl.
*H01M 4/88* (2006.01)
*H01M 4/86* (2006.01)
*H01M 4/38* (2006.01)
H01M 4/92 (2006.01)
H01M 4/02 (2006.01)

(52) U.S. Cl.
CPC ............ *H01M 4/885* (2013.01); *H01M 4/96* (2013.01); *H01M 4/38* (2013.01); *H01M 4/925* (2013.01); *H01M 4/926* (2013.01); *H01M 2004/027* (2013.01); *H01M 2004/8689* (2013.01); *Y02E 60/128* (2013.01)

(56) References Cited

FOREIGN PATENT DOCUMENTS

| | | |
|---|---|---|
| KR | 10-2013-0014650 A | 2/2013 |
| KR | 10-2013-0084903 A | 7/2013 |
| KR | 10-2014-0037508 A | 3/2014 |
| KR | 10-2014-0061818 A | 5/2014 |

OTHER PUBLICATIONS

Written Opinion for application No. PCT/KR2015/007465 dated Oct. 22, 2015.
Hun-Gi Jung, et al., "Ruthenium-Based Electrocatalysts Supported on Reduced Graphene Oxide for Lithium-Air Batteries", ACSNANO (www.acsnano.org), vol. 7, No. 4, 2013, pp. 3532-3539.

(a)　　　　　　　　　　　　(b)

(a)　　　　　　　　　　　　(b)

LITHIUM-AIR BATTERY AND METHOD FOR MANUFACTURING THE SAME

CROSS-REFERENCE TO RELATED APPLICATION

This application is a continuation of pending International Application No. PCT/KR2015/007465, which was filed on Jul. 17, 2015 and claims priority to Korean Patent Application No. 10-2014-0090733, filed on Jul. 18, 2014, in the Korean Intellectual Property Office, the disclosures of which are hereby incorporated by reference in their entireties.

BACKGROUND

1. Field

Embodiments of the inventive concepts relate to a lithium air battery and a method for manufacturing the same and, more particularly, to a lithium-air battery having a catalyst particle for controlling whether to generate $LiO_2$ as a discharge product and for controlling a generation amount of $LiO_2$, and a method for manufacturing the same.

2. Description of the Related Art

To realize electric cars and next-generation high-capacity energy storage devices, it is essential to use the next-generation storage devices beyond performance limits of conventional secondary batteries. General secondary battery materials for electric cars use a negative electrode active material and a positive electrode active material of carbon-based graphite (372 mAh/g) and a lithium transition metal oxide (e.g., $LiMn_2O_4$, $Li(Mn_{1/3}Ni_{1/3}Co_{1/3})O_2$, or $LiFePO_4$), which are combined with each other. However, since energy densities of the general secondary battery materials remain at the level of about 200 Wh/kg, the general secondary battery materials may be difficult to use for long-distance operation of 500 km or more. In addition, since a charging process is accompanied, additional charging stations should be established. Thus, the general secondary battery materials may have various limitations in popular commercialization.

These problems may be solved by increasing the energy density by 25 times those of general secondary batteries. These secondary batteries having the high energy density may be used for high-capacity energy storage devices as well as electric cars.

These next-generation batteries may include a lithium-sulfur (Li—S) battery and a lithium-air (Li—$O_2$) battery. Since sulfur and oxygen are much lighter than known transition metal-based positive electrode active materials, they may have a high theoretical capacity (proportional to a reciprocal of a molecular weight). Thus, when sulfur and oxygen are used as positive electrode active materials, secondary batteries may have higher reversible capacity. The lithium-sulfur battery follows a chemical reaction (2Li+S $\Leftrightarrow$ $Li_2S$, $V_{cell}^0$=2.2 V), and the lithium-air battery follows a chemical reaction (4Li+$O_2$ $\Leftrightarrow$ $2Li_2O$, $V_{cell}^0$=2.91 V, or 2Li+$O_2$ $\Leftrightarrow$ $Li_2O_2$, $V_{cell}^0$=2.96 V). The lithium-sulfur battery may have a very high unit theoretical energy density of 2,567 Wh/kg, and the lithium-air battery may have a very high unit theoretical energy density of 3,505 Wh/kg. The theoretical energy densities are 7 to 10 times higher than an energy density (387 Wh/kg) of a general lithium ion battery currently used. However, since an electrical conductivity of sulfur has a very low value of 10 S/cm to 30 S/cm, the lithium-sulfur battery needs assistance of a carbon conductor. In addition, the lithium-sulfur battery has a problem that sulfur is eluted into an electrolyte during reaction.

In the lithium-air battery, a lithium oxide generated by combination of lithium and oxygen should be decomposed for a reversible reaction. To solve this problem, various researches and developments are being conducted.

SUMMARY

Embodiments of the inventive concepts may provide a highly reliable lithium-air battery and a method for manufacturing the same.

Embodiments of the inventive concepts may also provide a long-life lithium-air battery and a method for manufacturing the same.

Embodiments of the inventive concepts may further provide a high-capacity lithium-air battery and a method for manufacturing the same.

Embodiments of the inventive concepts may further provide a lithium-air battery with improved charge/discharge efficiency and a method for manufacturing the same.

In an aspect, a lithium-air battery may include a negative electrode including lithium, a positive electrode including catalyst particles for controlling whether to generate $LiO_2$ as a discharge product and for controlling a generation amount of $LiO_2$, the positive electrode using oxygen as a positive electrode active material, and an electrolyte and a separator which are disposed between the negative electrode and the positive electrode.

In some embodiments, whether to generate $LiO_2$ as the discharge product and the generation amount of $LiO_2$ may be controlled according to an oxygen binding energy of the catalyst particles.

In some embodiments, an oxygen binding energy of the catalyst particles may be lower than an oxygen binding energy of carbon.

In some embodiments, the oxygen binding energy of the catalyst particles may be lower than 3 eV.

In some embodiments, the oxygen binding energy of the catalyst particles may range from 0 eV to 1 eV.

In some embodiments, the discharge product may include crystalline $LiO_2$.

In some embodiments, the discharge product may not include $Li_2O_2$ and $Li_2O$.

In some embodiments, the discharge product may further include $Li_2O_2$ and $Li_2O$, and the amount of $LiO_2$ may be more than those of $Li_2O_2$ and $Li_2O$.

In some embodiments, the positive electrode may further include a conductive structure supporting the catalyst particles.

In an aspect, a lithium-air battery may include a negative electrode including lithium, a positive electrode generating lithium oxide having a higher electrical conductivity and a lower polarization than $Li_2O_2$ and $Li_2O$ as a main discharge product, the positive electrode using oxygen as a positive electrode active material, and an electrolyte and a separator which are disposed between the negative electrode and the positive electrode.

In some embodiments, the positive electrode may generate $LiO_2$ as the main discharge product.

In some embodiments, the positive electrode may include catalyst particles serving as a catalyst for the generation of $LiO_2$, and a conductive structure supporting the catalyst particles.

In some embodiments, decomposition and generation amounts of $LiO_2$ may be more than decomposition and generation amounts of $Li_2O_2$ and $Li_2O$ during charging and discharging operations.

In an aspect, a method for manufacturing a lithium-air battery may include preparing a graphene oxide aqueous solution and a source material including a catalyst material, dissolving the source material in the graphene oxide aqueous solution to manufacture a source solution, reducing the graphene oxide and the catalyst material of the source material at the same time by performing a hydrothermal reaction or a heating reflux reaction in the source solution, thereby manufacturing a complex of graphene and catalyst particles, and manufacturing a positive electrode by using the complex, the positive electrode using oxygen as a positive electrode active material.

In some embodiments, whether to generate $LiO_2$ as a discharge product and a generation amount of $LiO_2$ may be controlled according to an oxygen binding energy of the catalyst particles.

DETAILED DESCRIPTION OF THE EMBODIMENTS

Figure 1:
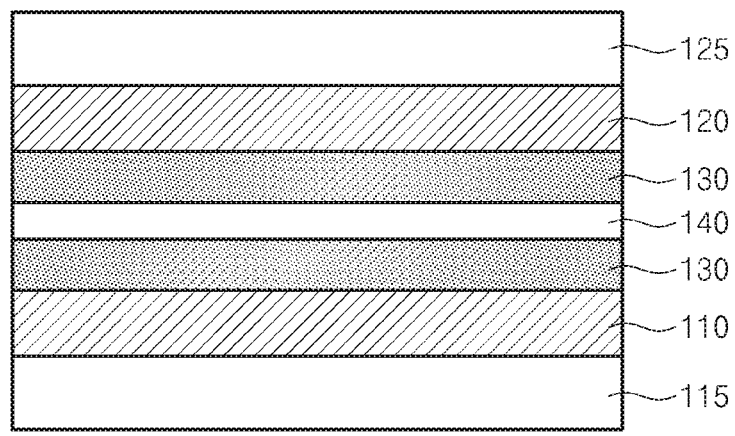
FIG. 1 is a view illustrating a lithium-air battery according to some embodiments of the inventive concepts.

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third, etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts.

Furthermore, in the present specification, an oxygen binding energy means reaction heat ($\Delta Eo$) of an oxygen binding reaction. In other words, the oxygen binding energy is a value obtained by subtracting an energy before being bound to oxygen from an energy after being bound to oxygen. When an element has the oxygen binding energy of a low value (e.g., a negative value), the element is strongly bound or bonded to oxygen. When an element has the oxygen binding energy of a high value, the element is weakly bound or bonded to oxygen.

FIG. 1 is a view illustrating a lithium-air battery according to some embodiments of the inventive concepts.

Referring to FIG. 1, a lithium-air battery according to some embodiments of the inventive concepts may include a first current collector 115, a negative electrode 110, a positive electrode 120, a second current collector 125, an electrolyte 130, and a separator 140.

The negative electrode 110 may include lithium (Li). The negative electrode 110 may be formed of lithium metal or an alloy of lithium and other metal. For example, the negative electrode 110 may include an alloy of lithium and at least one of silicon (Si), aluminum (Al), tin (Sn), magnesium (Mg), indium (In), or vanadium (V).

The first current collector 115 may be formed of a conductive material. For example, the first current collector 115 may be formed of copper, nickel, or stainless steel. The first current collector 115 may be coated with a cladding layer to prevent oxidation.

The electrolyte 130 may be disposed between the negative electrode 110 and the positive electrode 120. The electrolyte 130 may include tetraethyleneglycol dimethylether (TEGDME), dimethyl sulfoxide (DMSO), or dimethoxyethane (DME), in which a lithium salt is dissolved. For example, the lithium salt may include at least one of LiN(CF$_3$SO$_2$)$_2$, LiN(FSO$_2$)$_2$, LiN(C$_2$F$_5$SO$_2$)$_2$, LiC(CF$_2$SO$_2$)$_3$, LiBF$_4$, LiPF$_6$, LiClO$_4$, LiCF$_3$SO$_3$, or LiAsF$_6$.

The separator 140 may be disposed between the negative electrode 110 and the positive electrode 120. For example, the separator 140 may be a porous glass filter. Alternatively, the separator 140 may include at least one of olefin-based resin, fluorine-based resin (e.g., polyvinylidene fluoride or polytetrafluoroethylene), ester-based resin (e.g., polyethylene terephthalate), or cellulose-based non-woven fabric. In certain embodiments, the separator 140 may be formed of at least one of other various kinds of materials except the examples described above.

The second current collector 125 may be formed of a porous conductive material for easily supplying oxygen to the positive electrode 120. The second current collector 125 may be formed of conductive carbon, stainless steel, aluminum, or nickel.

The positive electrode 120 may use oxygen (O$_2$) as a positive electrode active material. The positive electrode 120 may include a catalyst particle and a conductive structure supporting the catalyst particle. In some embodiments, the conductive structure may include at least one of a carbon-based material (e.g., carbon black, carbon nanotube, graphene, or carbon fiber), a conductive inorganic material (e.g., molybdenum oxide, molybdenum carbide, or titanium carbide), or a conductive polymer material. In some embodiments, the catalyst particle may include at least one of a noble metal, a transition metal, a noble metal oxide, a transition metal oxide, carbide, a perovskite-based oxide, or a functionalized carbon-based material (e.g., a carbon-based material doped with N or P or having an oxygen functional group). For example, the catalyst particle may include at least one of ruthenium, iridium, platinum, palladium, gold, silver, cobalt, copper, iron, manganese, cerium, nickel, molybdenum, or any oxide thereof.

When the lithium-air battery according to embodiments of the inventive concepts discharges, LiO$_2$ may be generated as a discharge product at the positive electrode 120 by a reaction expressed by the following chemical formula 1. In some embodiments, the discharge product may be crystalline LiO$_2$.

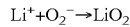   [Chemical formula 1]

The catalyst particle in the positive electrode 120 may control whether LiO$_2$ is generated at the positive electrode 120 or not. In addition, the catalyst particle in the positive electrode 120 may control a generation amount of LiO$_2$. In more detail, the generation of LiO$_2$ as the discharge product and the generation amount of LiO$_2$ may be controlled according to an oxygen binding energy of the catalyst particle.

In some embodiments, the oxygen binding energy of the catalyst particle in the positive electrode 120 may be lower or smaller than an oxygen binding energy of carbon or 3 eV. In more detail, the oxygen binding energy of the catalyst particle in the positive electrode 120 may range from 0 eV to 1 eV. Thus, when the lithium-air battery according to embodiments of the inventive concepts discharges, LiO$_2$ of the discharge product may be easily generated at the positive electrode 120. As a result, even though Li$_2$O$_2$ and Li$_2$O are not generated as the discharge product or Li$_2$O$_2$ and Li$_2$O are generated, the generation amount of LiO$_2$ may be more than those of Li$_2$O$_2$ and Li$_2$O.

If a positive electrode of a lithium-air battery does not include the catalyst particle for controlling whether to generate LiO$_2$ and for controlling the generation amount of LiO$_2$ unlike the aforementioned embodiments of the inventive concepts, LiO$_2$ may not be generated but Li$_2$O$_2$ and Li$_2$O may be generated as a discharge product of the lithium-air battery, or the generation amounts of Li$_2$O$_2$ and Li$_2$O may be more than the generation amount of LiO$_2$. In this case, Li$_2$O$_2$ and Li$_2$O may not be easily decomposed during a discharging operation of the lithium-air battery by low electrical conductivities and high decomposition polarization of Li$_2$O$_2$ and Li$_2$O, and thus charge/discharge efficiency of the lithium-air battery may be deteriorated.

However, according to embodiments of the inventive concepts, the positive electrode 120 may include the catalyst particle for controlling whether to generate LiO$_2$ and for controlling the generation amount of LiO$_2$, and thus LiO$_2$ may be generated as the discharge product at the positive electrode 120 but the generation of the Li$_2$O$_2$ and Li$_2$O may be minimized, as described above. Thus, the highly reliable lithium-air battery with the improved charge/discharge efficiency may be provided or realized.

A method for manufacturing a lithium-air battery according to some embodiments of the inventive concepts will be described hereinafter with reference to FIG. 2.

Figure 2:
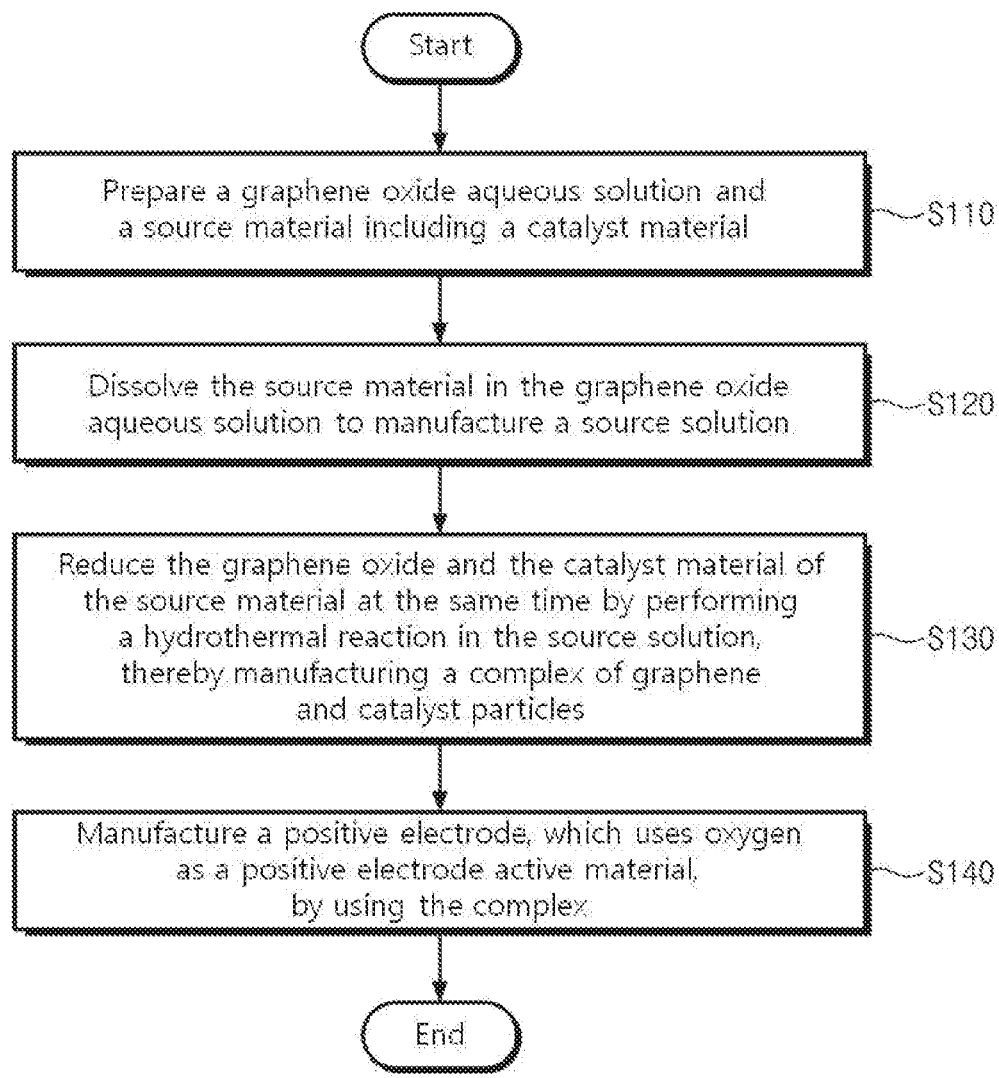
FIG. 2 is a flow chart illustrating a method for manufacturing a lithium-air battery according to some embodiments of the inventive concepts.

FIG. 2 is a flow chart illustrating a method for manufacturing a lithium-air battery according to some embodiments of the inventive concepts.

Referring to FIG. 2, a graphene oxide aqueous solution and a source material including a catalyst material are prepared (S110). For example, when the catalyst material is iridium (Ir), the source material may be iridium chloride hydrate (IrCl$_3$ H$_2$O) which is an iridium precursor. For another example, when the catalyst material is ruthenium (Ru) or ruthenium oxide (RuO$_2$), the source material may be ruthenium chloride (RuCl$_3$) which is a ruthenium precursor. For still another example, when the catalyst material is platinum (Pt), the source material may be chloroplatinic acid hydrate (H$_2$PtCl$_6$ 6H$_2$O) which is a platinum precursor. For yet another example, when the catalyst material is palladium (Pd), the source material may be palladium sodium chloride salt (Na$_2$PdCl$_4$ 6H$_2$O) which is a palladium precursor.

Graphene oxide in the graphene oxide aqueous solution may have surface defects or may have various functional groups (e.g., an epoxy group, a hydroxyl group, a carbonyl group, and/or a carboxylic acid group). The graphene oxide aqueous solution may be a solution obtained by dispersing the graphene oxide in a polar organic solvent such as ethylene glycol. Alternatively, the graphene oxide aqueous solution may be an aqueous solution in which the graphene oxide is dispersed.

The source material may be dissolved in the graphene oxide aqueous solution to manufacture a source solution (S120). A mixing ratio of the source material and the graphene oxide aqueous solution may be adjusted within a range that can be readily practiced by those skilled in the art.

The graphene oxide and the catalyst material of the source material may be reduced at the same time by performing a hydrothermal reaction in the source solution in which the source material is dissolved in the graphene oxide aqueous solution, thereby manufacturing a complex of graphene and catalyst particles (S130). For example, the hydrothermal reaction may be performed in the source solution at 180 degrees Celsius for 12 hours. For example, the catalyst particle may be 2 nm. The graphene may support the catalyst particles, and the complex may be porous.

In some embodiments, the surface defect of the graphene oxide may serve as a functional group for combination of the catalyst particle and the graphene during the process of reducing the graphene oxide and the catalyst material. Thus, the catalyst particles may be substantially uniformly dispersed in the graphene.

A positive electrode using oxygen as a positive electrode active material may be manufactured using the complex (S140). For example, the complex may be mixed with an organic binder and a solvent to manufacture a mixture, a current collector may be coated with the mixture, and the coated mixture may be dried to manufacture the positive electrode.

For example, the organic binder may include at least one of a fluorine resin-based binder (e.g., polyvinylidene fluoride (PVdF) or polytetrafluoroethylene (PTFE)), a gum-based binder (e.g., styrene-butadiene gum, acrylonitrile-butadiene gum, or styrene-isoprene gum), a cellulose-based binder (e.g., carboxymethylcellulose (CMC), starch, hydroxypropylcellulose, or regenerated cellulose), a polyalcohol-based binder, an olefin-based binder (e.g., polyethylene or polypropylene), a polyimide-based binder, a polyester-based binder, a mussel adhesive, or a silane-based binder.

For example, the solvent may include at least one of isopropyl alcohol, N-methyl-2-pyrrolidone, or acetone.

Thereafter, as described with reference to FIG. 1, a negative electrode including lithium and an electrolyte may be prepared, and a lithium-air battery may be manufactured using the negative electrode, the positive electrode, and the electrolyte.

As described above, according to some embodiments of the inventive concepts, the hydrothermal reaction may be performed in the source solution in which the graphene oxide aqueous solution is mixed with the source material having the catalyst material, thereby manufacturing the complex in which the catalyst particles are bonded to the graphene. Next, the positive electrode of the lithium-air battery may be manufactured using the complex. Whether to generate $LiO_2$ and the generation amount of $LiO_2$ may be controlled according to the oxygen binding energy of the catalyst particle of the complex in the discharging operation of the lithium-air battery. Thus, it is possible to provide the method for manufacturing the lithium-air battery capable of improving the charge/discharge efficiency generating $LiO_2$ corresponding to the discharge product.

Alternatively, according to other embodiments of the inventive concepts, a lithium-air battery generating $LiO_2$ of the discharge product may be manufactured using a positive electrode including a metal oxide and catalyst particles. A method for manufacturing a lithium-air battery according to other embodiments of the inventive concepts will be described hereinafter.

A metal oxide is prepared. The metal oxide may be porous. For example, the metal oxide may be molybdenum oxide ($MoO_2$).

When the metal oxide is the molybdenum oxide, the molybdenum oxide may be manufactured using cotton cloth to have porosity. In more detail, cotton cloth may be immersed in a phosphomolybdic acid hydrate (PMA) ethanol solution and may be then dried. The dried cotton cloth may be thermally treated in the air atmosphere to manufacture $MoO_3$. The $MoO_3$ may be reduced in an argon and hydrogen atmosphere to manufacture porous $MoO_2$.

The metal oxide may be dispersed in water, and the source material including the catalyst material described with reference to FIG. 2 may be mixed with the water including the metal oxide, thereby manufacturing a source solution. As described with reference to FIG. 2, the catalyst material of the source material may be reduced by performing the hydrothermal reaction in the source solution, thereby manufacturing a complex of the metal oxide and the catalyst particles.

Thereafter, as described with reference to FIG. 2, a positive electrode using oxygen as a positive electrode active material may be manufactured using the complex, and a lithium-air battery may be manufactured using the positive electrode.

Evaluation results of characteristics of the lithium-air batteries according to embodiments of the inventive concepts and a comparative example will be described hereinafter.

Manufacture of Lithium-Air Battery According to Embodiment 1

Iridium chloride hydrate ($IrCl_3$ $H_2O$) including iridium (Ir) corresponding to a catalyst material was dissolved in a graphene oxide aqueous solution to manufacture a source solution. Graphene oxide and iridium ions in iridium chloride hydrate were reduced at the same time by performing a hydrothermal reaction in the source solution at 180 degrees Celsius for 12 hours, thereby manufacturing a complex according to the embodiment 1, in which iridium catalyst particles of 2 nm were uniformly dispersed in and bonded to graphene (the reduced graphene oxide).

The complex according to the embodiment 1 was mixed with polyvinylidene fluoride (PVdF) at a mixing ratio of 8:2 to manufacture a first mixture, and the first mixture was dispersed in N-methyl-2-pyrrolidone to manufacture a second mixture. The second mixture was coated on a carbon paper and was then dried to manufacture a positive electrode. Thereafter, a coin cell type lithium-air battery according to the embodiment 1 was manufactured using a lithium metal foil as a negative electrode, using a porous glass filter of the Whatman company as a separator, and using an electrolyte in which 1M $LiCF_3SO_3$ was dissolved in tetraethylene glycol dimethyl ether.

Manufacture of Lithium-Air Battery According to Embodiment 2

A complex according to the embodiment 2, in which ruthenium dioxide ($RuO_2$) catalyst particles were uniformly dispersed and bonded to graphene, was manufactured using ruthenium chloride ($RuCl_3$) including ruthenium (Ru) being a catalyst material by the same method as the embodiment 1 described above.

Thereafter, by the same method as the embodiment 1 described above, a positive electrode was manufactured using the complex according to the embodiment 2, and a lithium-air battery including the positive electrode was manufactured.

Manufacture of Lithium-Air Battery According to Embodiment 3

Ruthenium chloride ($RuCl_3$) including ruthenium (Ru) being a catalyst material was dissolved in an ethylene glycol solution in which graphene oxide was dissolved, thereby manufacturing a source solution. A pH of the source solution was increased to 13 by a sodium hydroxide (NaOH) ethylene glycol solution. Thereafter, after the source solution was heated to 120 degrees Celsius, a heating reflux reaction was performed in the source solution at 120 degrees Celsius for 1 hour while slowly injecting a sodium borohydride (NaBH$_4$) ethylene glycol solution being a reducing agent into the source solution, thereby reducing graphene oxide and ruthenium ions of ruthenium chloride. Thus, a complex according to the embodiment 3, in which ruthenium catalyst particles were uniformly dispersed and bonded to graphene, was manufactured.

Thereafter, by the same method as the embodiment 1 described above, a positive electrode was manufactured using the complex according to the embodiment 3, and a lithium-air battery including the positive electrode was manufactured.

Manufacture of Lithium-Air Battery According to Embodiment 4

A complex according to the embodiment 4, in which platinum catalyst particles were uniformly dispersed and bonded to graphene, was manufactured using chloroplatinic acid hydrate (H$_2$PtCl$_6$ 6H$_2$O) including platinum (Pt) being a catalyst material by the same method as the embodiment 1 described above.

Thereafter, by the same method as the embodiment 1 described above, a positive electrode was manufactured using the complex according to the embodiment 4, and a lithium-air battery including the positive electrode was manufactured.

Manufacture of Lithium-Air Battery According to Embodiment 5

A complex according to the embodiment 5, in which palladium catalyst particles were uniformly dispersed and bonded to graphene, was manufactured using palladium sodium chloride salt (Na$_2$PdCl$_4$ 6H$_2$O) including palladium (Pd) being a catalyst material by the same method as the embodiment 1 described above.

Thereafter, by the same method as the embodiment 1 described above, a positive electrode was manufactured using the complex according to the embodiment 5, and a lithium-air battery including the positive electrode was manufactured.

Manufacture of Lithium-Air Battery According to Comparative Example

In the above embodiment 1, iridium chloride hydrate corresponding to the catalyst material was omitted to manufacture a graphene according to the comparative example, which did not include a catalyst particle. Thereafter, by the same method as the embodiment 1 described above, a positive electrode was manufactured using the graphene according to the comparative example, and a lithium-air battery including the positive electrode was manufactured.

Figure 3:
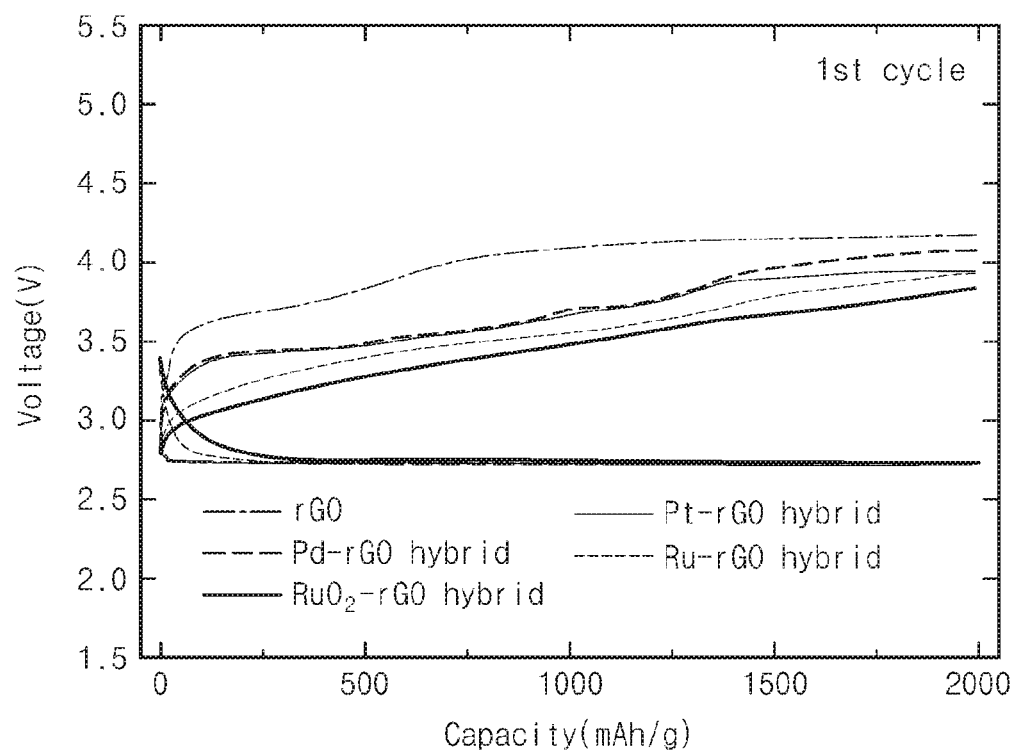
FIG. 3 is a graph illustrating charge/discharge characteristics of lithium-air batteries according to embodiments of the inventive concepts and a comparative example.
Figure 4:
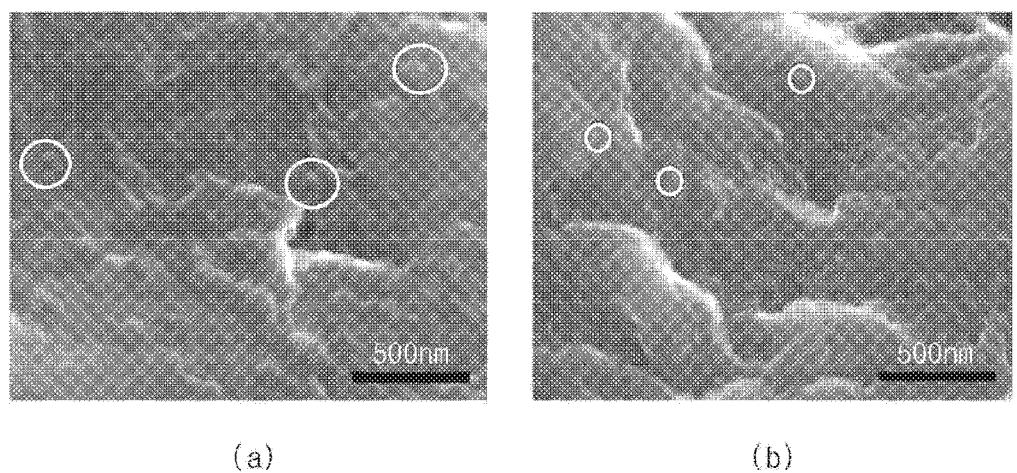
FIG. 4 shows scanning electron microscope (SEM) images of discharge products of lithium-air batteries according to embodiments of the inventive concepts and a comparative example.

FIG. 3 is a graph illustrating charge/discharge characteristics of lithium-air batteries according to embodiments of the inventive concepts and a comparative example, and FIG. 4 shows scanning electron microscope (SEM) images of discharge products of lithium-air batteries according to embodiments of the inventive concepts and a comparative example.

Referring to FIGS. 3 and 4, the lithium-air batteries according to the above embodiments 2 to 5 and the lithium-air battery according to the comparative example were inserted in a chamber filled with oxygen, and then, discharging and charging operations were performed on the lithium-air batteries under a current condition of 10 mA/g in a voltage range of 2.0V to 4.5V for 10 hours. A designator (a) of FIG. 4 is a SEM image of a discharge product generated at the positive electrode of the lithium-air battery according to the comparative example, and a designator (b) of FIG. 4 is a SEM image of a discharge product generated at the positive electrode of the lithium-air battery according to the embodiment 3.

As shown in FIG. 3, the lithium-air batteries including positive electrodes manufactured using the complexes of the catalyst particles and the graphene according to the embodiments of the inventive concepts have very excellent charge/discharge characteristics as compared with the lithium-air battery including the positive electrode manufactured using the graphene not including the catalyst particle according to the comparative example. In other words, the discharge products having relatively low polarization are generated by the catalyst particles in the lithium-air batteries according to the embodiments of the inventive concepts.

Figure 5:
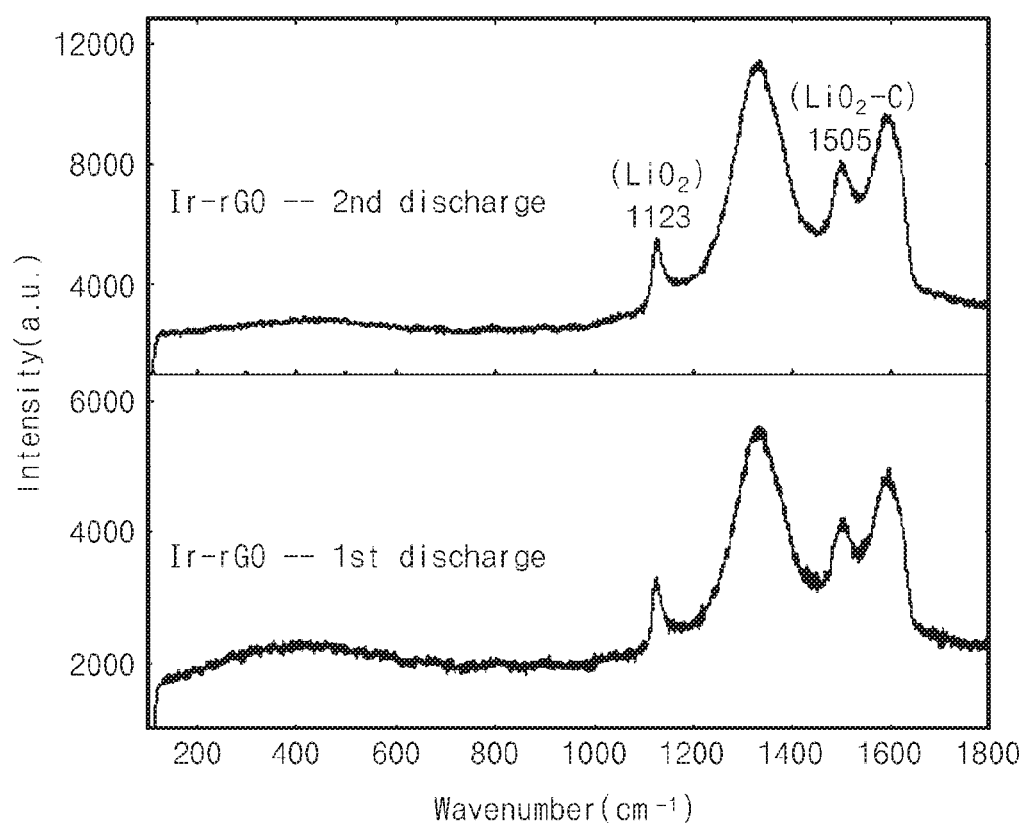
FIG. 5 is a Raman spectrum graph of a lithium-air battery according to embodiments of the inventive concepts.
Figure 6:
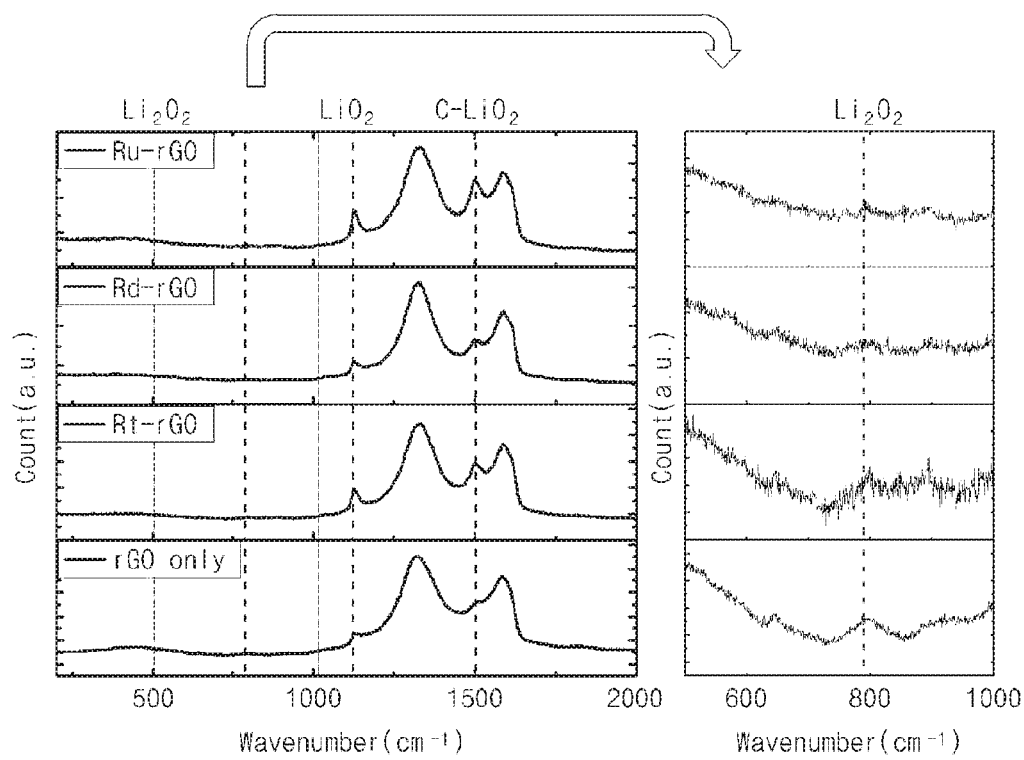
FIG. 6 illustrates Raman spectrum graphs of lithium-air batteries according to embodiments of the inventive concepts and a comparative example.

FIG. 5 is a Raman spectrum graph of a lithium-air battery according to embodiments of the inventive concepts, and FIG. 6 illustrates Raman spectrum graphs of lithium-air batteries according to embodiments of the inventive concepts and a comparative example.

Referring to FIGS. 5 and 6, after the charging and discharging operations were performed on the lithium-air batteries under the same conditions as described with reference to FIG. 3, Raman spectra of the lithium-air batteries of the embodiments 1 to 4 and the comparative example were measured.

As shown in FIGS. 5 and 6, LiO2 is main discharge products of the lithium-air batteries including the positive electrodes manufactured using the complexes of the graphene and the catalyst particles (iridium, ruthenium, palladium, and platinum) according to the embodiments of the inventive concepts, unlike the lithium-air battery including the positive electrode manufactured using the graphene not including the catalyst particle. The amount of $Li_2O_2$ in the discharge product in the case of the graphene not including the catalyst particle is more than the amount of $Li_2O_2$ in the discharge product in the case of the graphene including the catalyst particles.

In other words, $LiO_2$ as the discharge product is not easily generated by a high oxygen binding energy of carbon (oxygen is weakly bonded thereto) in the lithium-air battery including the positive electrode manufactured using carbon (reduced graphene oxide) according to the comparative example. However, $LiO_2$ as the discharge product is easily generated by low oxygen binding energies of the catalyst particles (oxygen is strongly bonded thereto) in the lithium-air batteries including the positive electrodes manufactured using the catalyst particles (e.g., iridium, ruthenium, palladium, and platinum) according to the embodiments. The oxygen binding energies of the catalyst particles are lower than the oxygen binding energy of carbon. As a result, the positive electrode of the lithium-air battery may be manufactured using the catalyst particle for controlling whether to generate $LiO_2$ as the discharge product and for controlling the generation amount of $LiO_2$ according to the embodiments of the inventive concepts, thereby effectively minimizing the generation of $Li_2O_2$ and/or $Li_2O$ and effectively generating $LiO_2$ as the discharge product.

Figure 7:
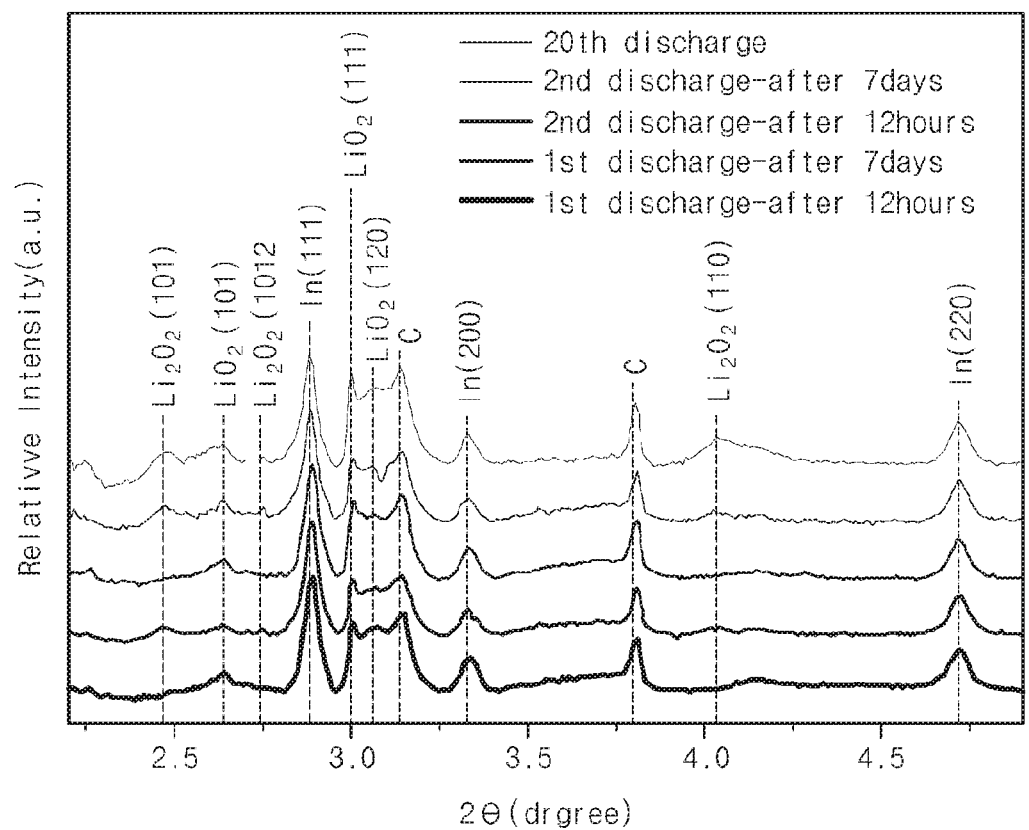
FIG. 7 is a result graph of high energy X-ray diffraction (HEXRD) of a discharge product of a lithium-air battery according to embodiments of the inventive concepts.

FIG. 7 is a result graph of high energy X-ray diffraction (HEXRD) of a discharge product of a lithium-air battery according to embodiments of the inventive concepts.

Referring to FIG. 7, a HEXRD of the lithium-air battery including the positive electrode manufactured using the complex of iridium and graphene according to the embodiment 1 was measured. Crystalline $LiO_2$ was generated as the discharge product of the lithium-air battery according to the embodiment 1. In addition, $Li_2O_2$ or $Li_2O$ was not formed as the discharge product, but $LiO_2$ was generated.

Figure 8:
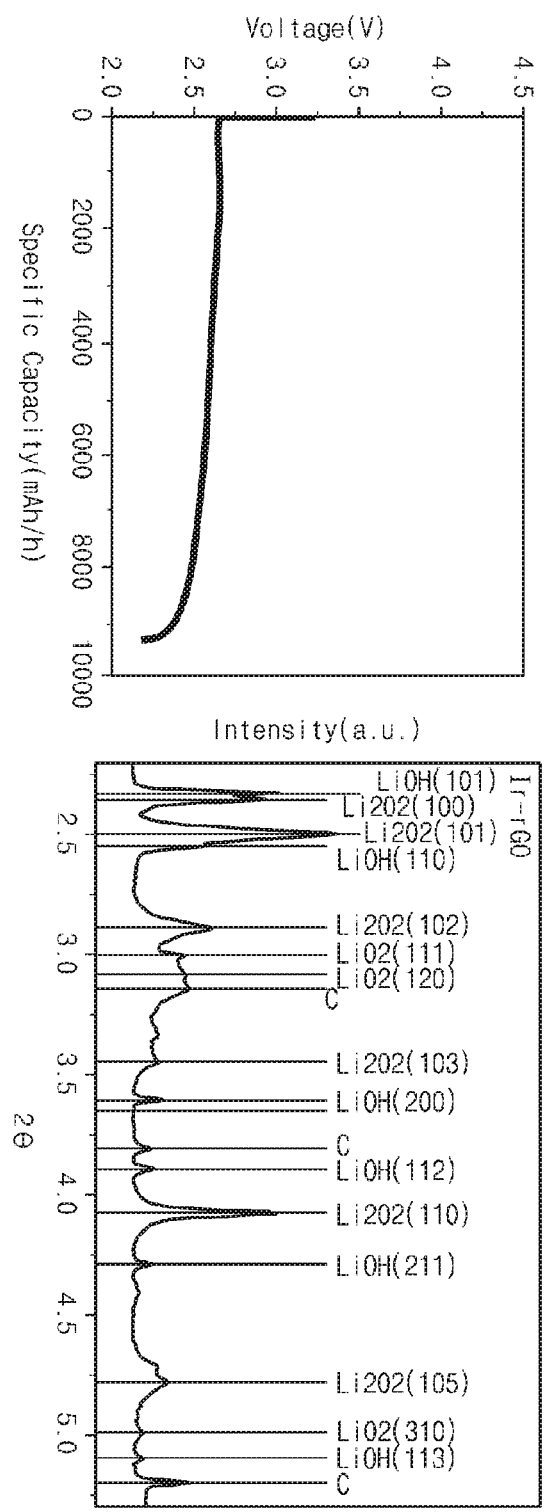
FIG. 8 illustrates a deep discharge graph and a HEXRD result graph of a lithium-air battery according to embodiments of the inventive concepts.
Figure 9:
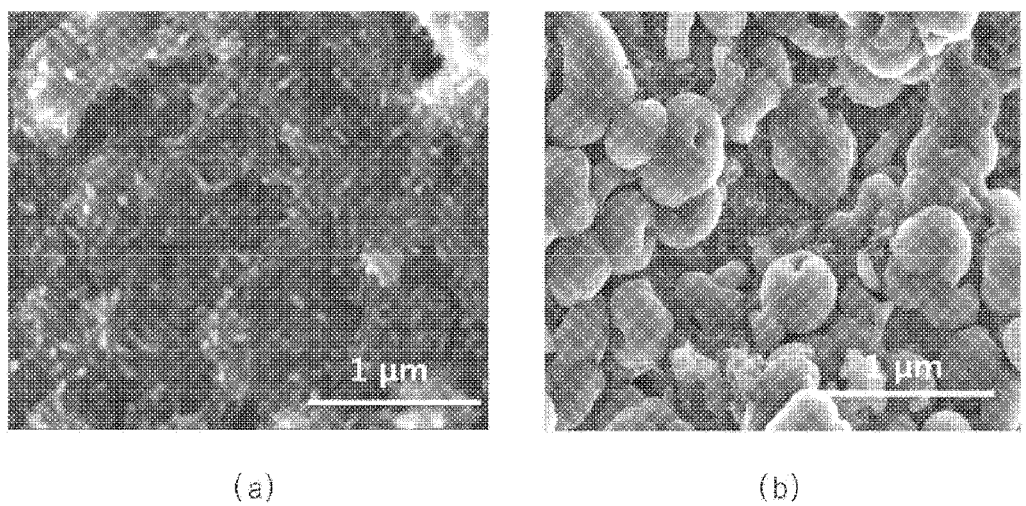
FIG. 9 shows SEM images of a discharge product of a lithium-air battery according to embodiments of the inventive concepts.

FIG. 8 illustrates a deep discharge graph and a HEXRD result graph of a lithium-air battery according to embodiments of the inventive concepts, and FIG. 9 shows SEM images of a discharge product of a lithium-air battery according to embodiments of the inventive concepts.

Referring to FIGS. 8 and 9, after discharging the lithium-air battery according to the embodiment 1 with a limited capacity of 1,000 mAh/g, a discharge product was photographed by a scanning electron microscope. In addition, after deeply discharging the lithium-air battery at 2.2V and 9,500 mAh/g, a discharge product was photographed by the scanning electron microscope.

As shown in FIGS. 8 and 9, $LiO_2$ is generated as the discharge product when the limited discharging operation of 1,000 mAh/g is performed on the lithium-air battery, but toroid known as a $Li_2O_2$ shape is generated when the deep charging operation is performed.

Figure 10:
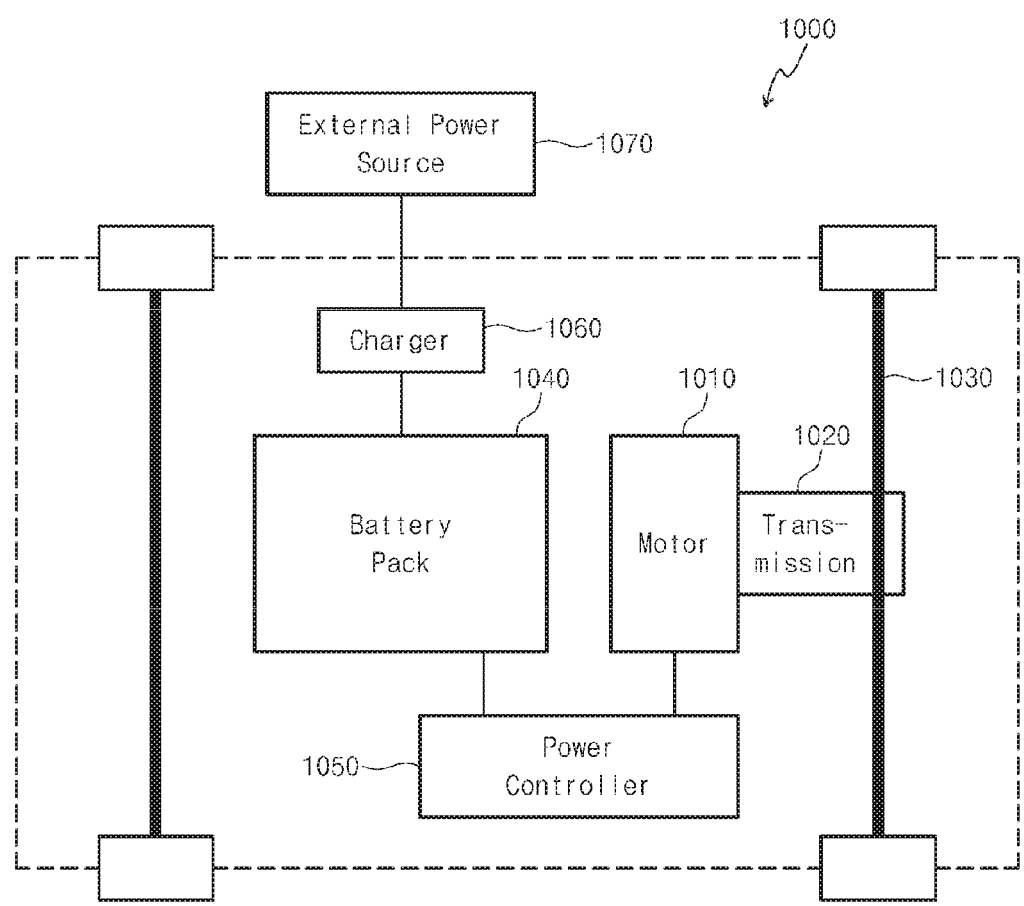
FIG. 10 is a schematic block diagram illustrating an electric car including a lithium-air battery according to embodiments of the inventive concepts.

FIG. 10 is a schematic block diagram illustrating an electric car including a lithium-air battery according to embodiments of the inventive concepts.

Referring to FIG. 10, an electric car 1000 according to some embodiments of the inventive concepts may include a motor 1010, a transmission 1020, an axle 1030, a battery pack 1040, and at least one of a power controller 1050 or a charger 1060.

The motor 1010 may convert electric energy of the battery pack 1040 into kinetic energy. The motor 1010 may provide the converted kinetic energy to the axle 1030 through the transmission 1020. The motor 1010 may consist of a single motor or a plurality of motors. For example, when the motor 1010 consists of the plurality of motors, the motor 1010 may include a front motor supplying kinetic energy to a front axle and a rear motor supplying kinetic energy to a rear axle.

The transmission 1020 may be located between the motor 1010 and the axle 1030 and may shift and supply the kinetic energy from the motor 1010 to the axle 1030 to meet a driving environment desired by a driver.

The battery pack 1040 may store electric energy provided from the charger 1060 and may provide the stored electric energy to the motor 1010. The battery pack 1040 may directly provide the electric energy to the motor 1010 and/or may provide the electric energy to the motor 1010 through the power controller 1050.

At this time, the battery pack 1040 may include at least one battery cell. The battery cell may include the lithium-air battery according to the aforementioned embodiments of the inventive concepts. Meanwhile, the battery cell may mean an individual battery, and the battery pack may mean a battery cell assembly in which battery cells are connected to each other to meet desired voltage and/or capacity.

The power controller 1050 may control the battery pack 1040. In other words, the power controller 1050 may control the batter pack 1040 to allow the power transmitted from the battery pack 1040 to the motor 1010 to have desired voltage, current and waveform. To achieve this, the power controller 1050 may include at least one of a passive power device or an active power device.

The charger 1060 may receive power from an external power source 1070 illustrated in FIG. 10 and may provide the power to the battery pack 1040. The charger 1060 may entirely control a charging state. For example, the charger 1060 may control on/off of charging and a charging rate.

The positive electrode of the lithium-air battery according to embodiments of the inventive concepts may include the catalyst particles which control whether to generate $LiO_2$ and control the generation amount of $LiO_2$. Thus, $LiO_2$ may be generated as the discharge product at the positive electrode, and the generation of $Li_2O_2$ and $Li_2O$ having the low electrical conductivity and the high polarization may be minimized. As a result, the highly reliable lithium-air battery with the improved charge/discharge efficiency may be provided or realized.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A method for manufacturing a lithium-air battery, the method comprising:
preparing a graphene oxide aqueous solution and a source material including a catalyst material, wherein the graphene oxide aqueous solution includes a graphene oxide having surface defects;
dissolving the source material in the graphene oxide aqueous solution to manufacture a source solution;
reducing the graphene oxide and the catalyst material of the source material at the same time by performing a hydrothermal reaction or a heating reflux reaction in the source solution, thereby manufacturing a complex of graphene and catalyst particles, wherein the surface defect of the graphene oxide serves as a functional group for combination of the catalyst particles and the graphene; and
manufacturing a positive electrode by using the complex, the positive electrode using oxygen as a positive electrode active material,
wherein when the catalyst material is iridium, the source material is iridium chloride hydrate.

2. The method of claim 1, wherein generating $LiO_2$ as a discharge product and a generation amount of $LiO_2$ are controlled by an oxygen binding energy of the catalyst particles.

3. The method of claim 1, wherein the positive electrode comprises the catalyst particles and a conductive structure supporting the catalyst particles.

* * * * *